United States Patent
Deselaers et al.

(10) Patent No.: US 12,223,410 B2
(45) Date of Patent: Feb. 11, 2025

(54) LANE SELECTION USING MACHINE LEARNING

(71) Applicant: GOOGLE LLC, Mountain View, CA (US)

(72) Inventors: Thomas Deselaers, Zurich (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/589,391

(22) Filed: Feb. 27, 2024

(65) Prior Publication Data

US 2024/0202490 A1 Jun. 20, 2024

Related U.S. Application Data

(63) Continuation of application No. 17/138,866, filed on Dec. 30, 2020, now Pat. No. 11,915,115.

(Continued)

(51) Int. Cl.
*G06N 3/006* (2023.01)
*B60W 30/18* (2012.01)
(Continued)

(52) U.S. Cl.
CPC ....... *G06N 3/006* (2013.01); *B60W 30/18163* (2013.01); *G06F 18/217* (2023.01);
(Continued)

(58) Field of Classification Search
CPC .......... G06N 3/006; G06N 20/00; G06N 3/08; G06N 7/01; B60W 30/18163;
(Continued)

(56) References Cited

U.S. PATENT DOCUMENTS 6,246,961 B1 * 6/2001 Sasaki ................. B60W 30/095
701/28
6,445,809 B1 * 9/2002 Sasaki ................. G06V 20/588
382/104

(Continued)

FOREIGN PATENT DOCUMENTS

| AU | 2017100399 A4 | 5/2017 |
| DE | 10 2017 216 202 A1 | 3/2019 |
| KR | 10-0456055 B1 | 11/2004 |

OTHER PUBLICATIONS

Redelmeier et al., "Are Those Other Drivers Really Going Faster?," Chance, 13(3):8-14 (2000).

(Continued)

*Primary Examiner* — Sizo B Vilakazi
(74) *Attorney, Agent, or Firm* — MARSHALL, GERSTEIN & BORUN LLP

(57) ABSTRACT

To select a lane in a multi-lane road segment for a vehicle travelling on the road segment, a system identifies, in multiple lanes and in a region ahead of the vehicle, another vehicle defining a target; the system applies an optical flow technique to track the target during a period of time, to generate an estimate of how fast traffic moves; and the system applies the estimate to machine learning (ML) model to generate a recommendation which one of the plurality of lanes the vehicle is to choose.

20 Claims, 5 Drawing Sheets

Related U.S. Application Data

(60) Provisional application No. 62/956,231, filed on Dec. 31, 2019.

(51) Int. Cl.
| | |
|---|---|
| *G06F 18/21* | (2023.01) |
| *G06N 20/00* | (2019.01) |
| *G06V 10/764* | (2022.01) |
| *G06V 10/82* | (2022.01) |
| *G06V 20/56* | (2022.01) |
| *G06V 20/58* | (2022.01) |

(52) U.S. Cl.
CPC .......... *G06N 20/00* (2019.01); *G06V 10/764* (2022.01); *G06V 10/82* (2022.01); *G06V 20/58* (2022.01); *G06V 20/588* (2022.01); *B60W 2420/403* (2013.01); *B60W 2520/10* (2013.01); *B60W 2552/10* (2020.02); *B60W 2555/20* (2020.02)

(58) Field of Classification Search
CPC ....... B60W 2420/403; B60W 2520/10; B60W 2552/10; B60W 2555/20; G06F 18/217; G06V 10/764; G06V 10/82; G06V 20/58; G06V 20/588

See application file for complete search history.

(56) References Cited

U.S. PATENT DOCUMENTS

| | | | |
|---|---|---|---|
| 6,944,538 | B2 | 9/2005 | Ishibashi et al. |
| 7,930,095 | B2 | 4/2011 | Lee |
| 9,240,123 | B2* | 1/2016 | Stenneth .............. G08G 1/0112 |
| 9,672,734 | B1 | 6/2017 | Ratnasingam |
| 2001/0010540 | A1* | 8/2001 | Ogura .................... H04N 7/188 |
| | | | 348/136 |
| 2015/0262480 | A1 | 9/2015 | Fowe et al. |
| 2017/0076598 | A1 | 3/2017 | Scofield et al. |
| 2017/0337816 | A1 | 11/2017 | Lu et al. |
| 2021/0201051 | A1* | 7/2021 | Deselaers ................ G06N 7/01 |
| 2022/0108610 | A1* | 4/2022 | Dhillon .................. G08G 1/056 |
| 2022/0185326 | A1* | 6/2022 | Isele ................ B60W 60/0015 |
| 2022/0185334 | A1* | 6/2022 | Bae .................... B60W 60/0011 |
| 2022/0306152 | A1* | 9/2022 | Zhang ............. B60W 30/18159 |
| 2023/0037367 | A1* | 2/2023 | Qian .................. B60W 30/143 |
| 2023/0102929 | A1* | 3/2023 | Sjolin ................... B60W 40/04 |
| | | | 701/25 |

OTHER PUBLICATIONS

Bostrom, "Cars in the Next Lane Really Do Go Faster," University of Cambridge (2000).

\* cited by examiner

LANE SELECTION USING MACHINE LEARNING

CROSS-REFERENCE TO RELATED APPLICATION

This application is a continuation of U.S. patent application Ser. No. 17/138,866, filed on Dec. 30, 2020, entitled "Lane Selection Using Machine Learning," which claims priority to U.S. Provisional Patent Application. No. 62/956,231, filed on Dec. 31, 2019, and titled "Lane Selection Using Machine Learning," the entire disclosures of which are hereby expressly incorporated by reference herein.

FIELD OF THE DISCLOSURE

The present disclosure relates to navigation systems and, more particularly, to automatically determining a lane in which a vehicle should travel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, numerous electronic devices such as personal computers, tablets, mobile phones, special-purpose navigators, etc. provide digital maps of geographic areas and step-by-step instructions for navigating between geographic locations. Navigation services can provide navigation directions, and in some cases relevant digital maps, via special-purpose software applications such as mapping and navigation applications as well as via general-purpose software applications such as web browsers.

Generally speaking, step-by-step driving instructions guide a user from a source to a destination and specify maneuvers such as turning, merging, making U-turns, etc. at various waypoints. A driving instruction in some cases specifies which lane at an intersection is more suitable for a subsequent maneuver, e.g., the second from the left lane for a two-lane turn, when the user must make a right turn shortly after completing the left turn. However, in most cases step-by-step driving instructions do not provide an indication in which lane the vehicle should travel to reach the destination in an optimal manner.

SUMMARY

A system of this disclosure is configured to determine the current traffic conditions in the environment surrounding the vehicle and generate a recommendation regarding the lane in which the vehicle should travel. The system can provide the recommendation to the driver of the vehicle or, when the vehicle is autonomous, provide the recommendation to the controller that implements the self-driving software architecture.

To assess the current traffic conditions, the system can use a camera which can be embedded in a smartphone and mounted on the dashboard, embedded in the vehicle, or operating elsewhere to provide imagery of the environment through the vehicle travels. The camera in these implementations can be oriented toward the road ahead of the vehicle. In other implementations, the system can utilize input from on one or more other sensors, operating in the vehicle or outside the vehicle.

When the vehicle travels on a multi-lane road segment, the system can determine how fast vehicles are moving in each lane. To this end, the system can use suitable optical recognition/optical flow techniques, for example. The system then can supply the determined speeds in the lanes to a machine learning (ML) model, which then can generate a recommendation regarding a lane in which the vehicle should travel. The ML model can implement contextual bandit techniques to "withhold" the reward until the end of a relatively long event, such as arriving at the next waypoint or even at the end of the route.

One example embodiment of these techniques is a method for selecting a lane in a multi-lane road segment for a vehicle travelling on the road segment. The method can be executed by one or more processors and includes determining current traffic information for the road segment including a plurality of lanes; applying the current traffic information to a machine learning (ML) model to generate an indication of one of the plurality of lanes in which the vehicle is to travel; subsequently to the vehicle selecting the indicated lane, determining an amount of time the vehicle took to travel a certain distance following the selection; and providing the determined amount of time to the ML model as a feedback signal.

Another example embodiment of these techniques is a computing system configured to implement the method above.

DETAILED DESCRIPTION

Figure 1A:
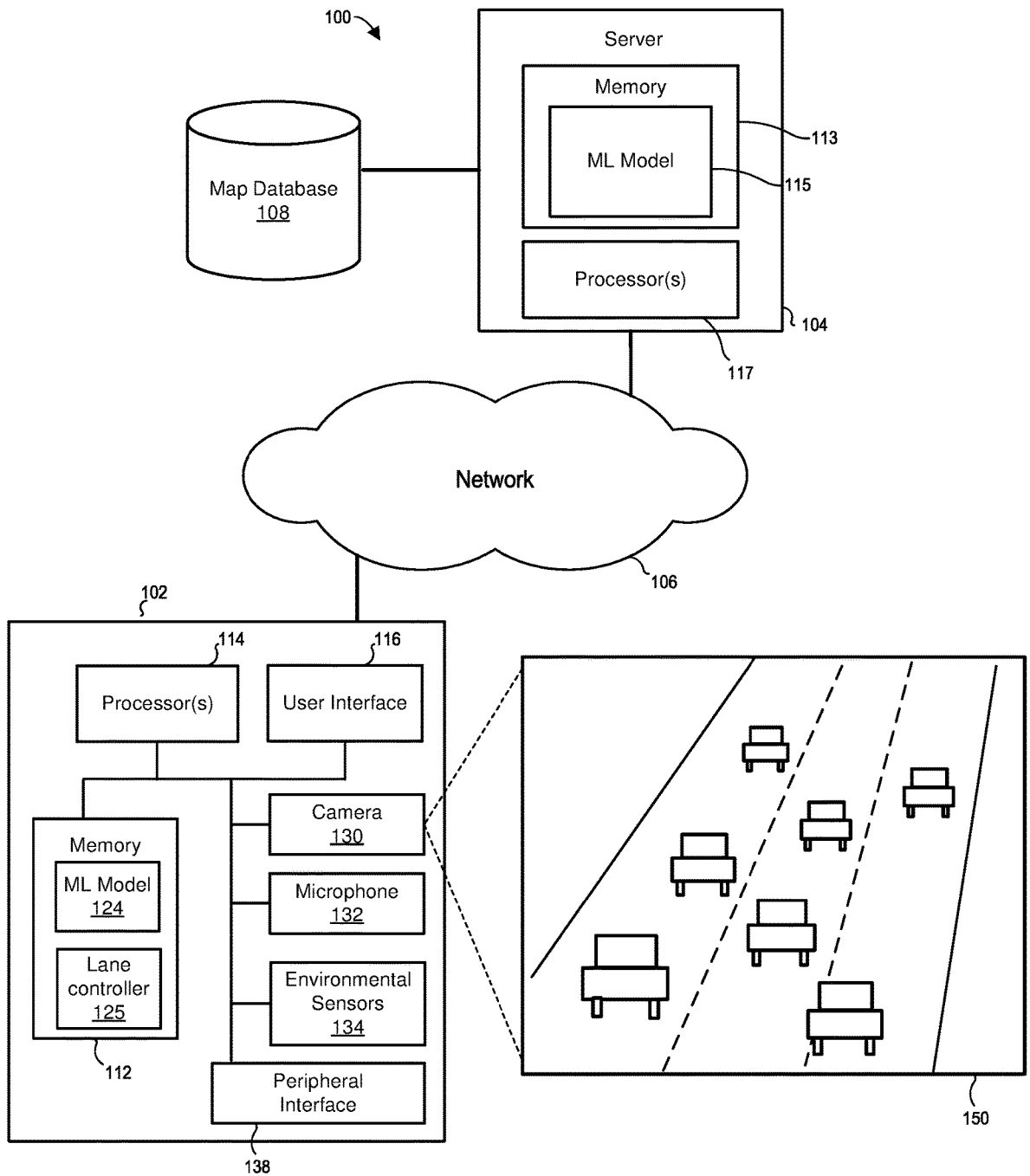
FIG. 1A is a block diagram of an system in which techniques of this disclosure for generating lane suggestions can be implemented.

Techniques for automatically selecting a lane for driving on a multi-lane road can be implemented in an example system of FIG. 1A. The system 100 includes a client device 102 which can be, for example, a personal computer, a portable device such as a tablet computer or smartphone, a wearable computing device, a special-purpose car navigator, a device embedded in a head unit of a vehicle, etc. The system 100 in general can include any suitable number of client computing devices.

The system 100 further includes one or more geographic data servers 104 operated by a provider of mapping navigation services. The server 104 can provide map data, navigation data, traffic data, etc. to the client device 102 and other client devices. The system 100 in various implementations also can include, or cooperate with, services that provide weather data, current traffic light information, road construction and traffic delay information, etc. In general, the system 100 can include any suitable number of providers of content and/or databases related to transportation, such as providers of scheduling and routing information for trains, buses, ferries, etc.

The server 104 can be communicatively coupled to a map database 108 that stores map data for various geographic areas. The map data can specify the shapes and various properties of geographic features such as roads, buildings, lakes, rivers, parks, etc. The map data can conform to any suitable format such as vector graphics, rasterized images, text for labels, etc. and organized according to any suitable principle (e.g., square map tiles covering the same amount of area at a certain zoom level). The map data also can include street-level imagery and photographs taken from various vantage points. Further, map data in the database 108 can include road lane information such as the lane count for various road segments for example. The server 104 and the client device 102 can be connected via a communication network such as the Internet.

The server 104 includes processing hardware that includes one or more processors 117 coupled to a non-transitory, computer-readable memory 115. A ML model for generating lane recommendations can reside in the memory 115. The ML model in some implementations is based on a contextual bandit model. More particularly, the ML model can make a selection of a lane based on the current context, which can include the speed at which vehicles move in various lanes and, in some cases, road geometry information indicating lane merges or lane restrictions, traffic light, etc. The ML model can process feedback signals such as the time and distance travelled in accordance with a lane recommendation. In another implementation, the ML model is based on reinforcement learning. During training, the server 104 can utilize information received from various embedded or general-purpose devices such as the user device 12 for example. Example feature architecture and training processes are further discussed below with reference to FIG. 3.

The client device 102 can include processing hardware such as a memory 112 storing a personalized ML model 124 and one or more processors 114 coupled to the memory 112. The memory 112 also can store a lane controller 125 that can operate the ML model 124 to obtain lane recommendations and, in some cases, to train the ML model 124 (e.g., by providing feedback signals in the form of metrics of time, distance, the "cost" of maneuvering). The client device 102 further can include a user interface 116 such as one a touchscreen for example, one or more cameras 30, a microphone 132, one or more sensors 134 to measure such environmental parameters as temperature, air pressure, etc., and a peripheral interface 138 to support wired and/or wireless connections to external devices. In some implementations, the client device 102 can include additional components such as a lidar for example. An example image 150, which the camera 130 can capture, depicts a segment of a multi-lane road.

In operation, the client device 102 and/or the server 104 can analyze the image 150 to detect the number of lanes, the number of cars moving through the road segment, and the speed at which the cars move in each lane. In some implementations, the client device 102 trains and applies only the local ML model 124 to generate lane suggestions. In other implementations, the user of the client device 102 configures the client device 102 to provide road imagery and sensor data to the server 104, which then applies the data to the ML model 115. In still other implementation, the server 124 trains a "master" ML Model 115 using data from multiple devices, and provides the client device 102 constructs a device-specific ML model 124 on the basis of the master ML model 115.

Figure 1B:
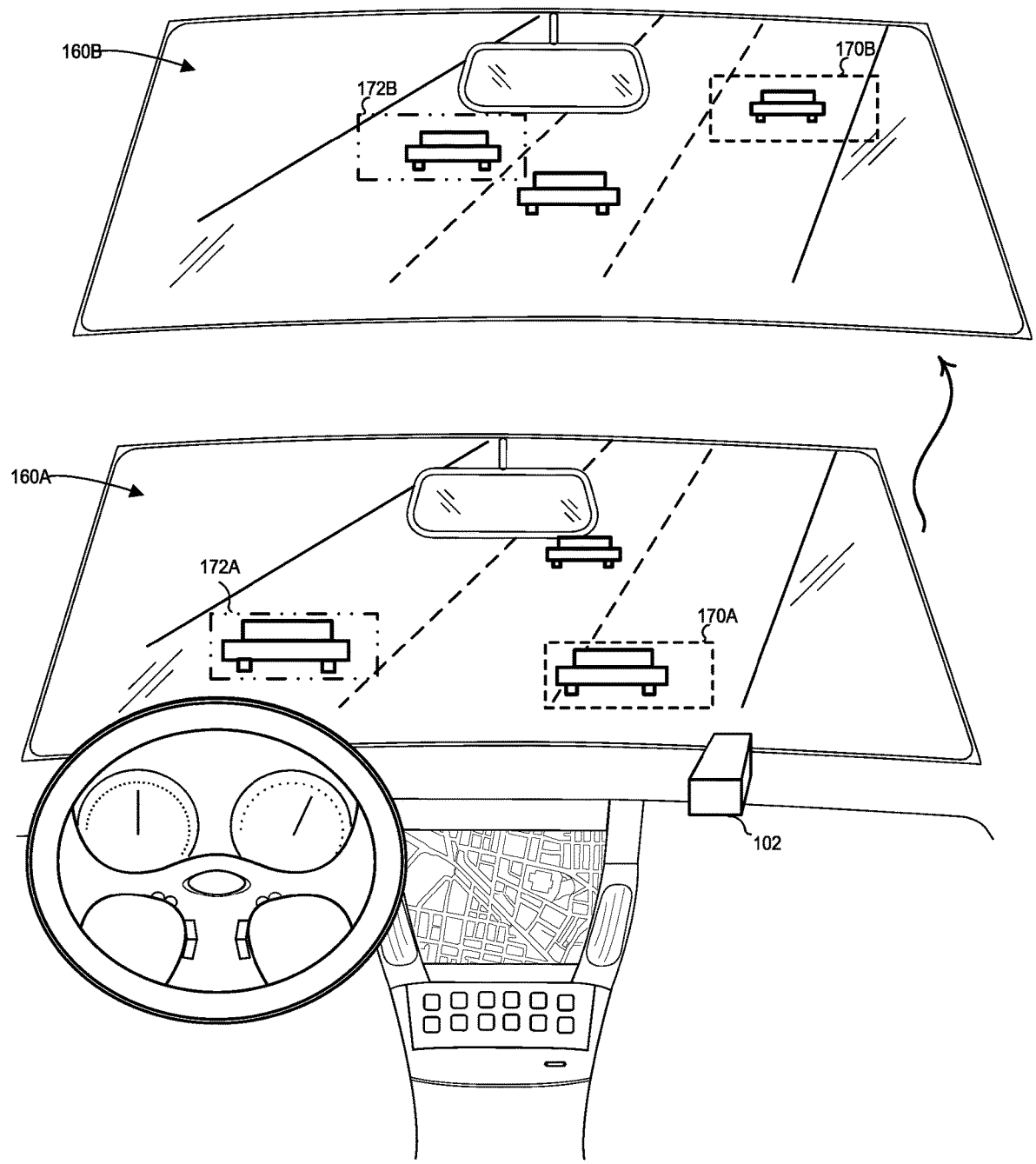
FIG. 1B illustrates an example environment in which a camera mounted on a dashboard can be used to analyze current conditions of the environment in which the vehicle operates.

The lane controller 125 can operate in a vehicle to augment navigation instructions with lane-specific instructions. For example, the client device 102 can be a smartphone configured to receive navigation directions from the server 104 and add lane-specific recommendations (e.g., "change to the left lane") to these navigation instructions (e.g., "continue on route 101 for 10 miles"). The client device 102 in this case can be equipped with a camera, and the user can install the client device on the dashboard so that the camera faces the road ahead of the vehicle to generate imagery such as the image 150. Alternatively or additionally, the client device 102 can receive imagery of the road from an external camera 180, as illustrated in FIG. 1B. In still other implementations, the functionality of the client device 102 is implemented in an autonomous (or "self-driving") vehicle, and the ML model 124 generates an output which a vehicle controller directly applies to maneuver the autonomous vehicle rather than provide recommendations to the driver.

Referring to FIGS. 1A and 1B, the built-in camera 130 or the externa camera 180 can capture a series of images 160A, 160B, etc. at times $t_1$, $t_2$, respectively. As illustrated in FIG. 1B, the images 160A and 160B approximately correspond to the vantage point of the driver of a non-autonomous vehicle or the imaging system of an autonomous vehicle. To generate input for the ML model 115 or 124, the lane controller 125 of the client device 102 can identify a target in a region 170A in the image 160A and track the target to the region 170B in the image 160B, for the right lane. Similarly, for the left lane, the lane controller 125 can identify a target (e.g., another vehicle) in a region 172B in the image 160A and track the target to the region 127B in the image 160B. More specifically, the lane controller 125 can apply image recognition techniques to identify the targets within the regions 170A, 172A and apply optical flow techniques to track these targets to the regions 170B, 172B. The lane controller 125 then can estimate the speed at which these targets move.

Figure 2A:
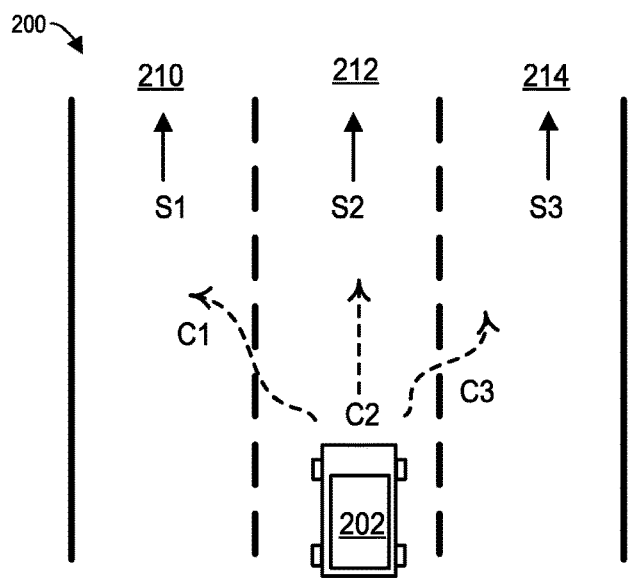
FIG. 2A is a block diagram schematically illustrating lane selection in view of the speed at which traffic moves in the respective lanes, which can be implemented in the system of FIG. 1A or 1B.

Now referring to FIG. 2A, the lane controller 125 can track targets in various lanes using suitable image recognition and optical flow techniques to determine the current traffic information including the current speed $S_1$ of traffic in lane 210, the current speed $S_2$ of traffic in lane 212, and the current speed $S_3$ of traffic in lane 214. The speed of traffic in each lane can be understood as a reward for the purposes of applying the ML model 115 or 124. More specifically, for a vehicle 202 currently travelling in lane 212, the reward of maneuvering to 210 will be the speed $S_1$. When $S_1 > S_2$, the reward will be higher than staying in the current lane. Conversely, when $S_2 < S_1$, the reward will be lower than staying in the current lane.

In some implementations or scenarios, the lane controller 125 further calculates the speed of traffic in the original lane from which the vehicle 202 switched to another lane. The lane controller 125 in this case can calculate one reward based on the speed of travel in the new lane, and another reward based on the speed of travel in the original lane. Further, the lane controller 125 in some implementations can calculate a reward for executing a lane change using a linear combination of the first and second rewards based on the speed of travel in the original lane and the speed of travel in the new lane, respectively.

Moreover, as schematically illustrated in FIG. 2A, a certain cost is associated with changing lanes: a cost $C_1$ of changing to the left lane 210, a cost $C_2$ of staying in the middle lane 212, and a cost $C_3$ of changing to the right lane 214. The cost $C_2$ of staying can be set to zero, in at least some of the implementations. The cost $C_1$, $C_2$, etc. can be any suitable numerical metric of discomfort to the driver, configured universally for all drivers and/or individually for different drivers. For example, the system of FIGS. 1A and 1B can limit the number of lane changes on a per-distance and/or per-time-interval bases, to prevent drivers or autonomous from excessive maneuvering. Further, the ML model 124 can include metrics of discomfort specifically for the user of the client device 102. One driver for example can tend to avoid lane changes, while another driver can be more comfortable with lane changes. The lane controller 125 can train the ML model 124 to generate these metrics of discomfort for the driver based on his or her driving patterns, provided the user operates certain user controls or installs certain applications so as to permit the lane controller 125 to use the data in this manner. Still further, the lane controller 125 can dynamically determine the cost metrics $C_1$, $C_2$, etc. in view of the environmental conditions such as the state of the traffic (e.g., to increase these metrics when the road is heavily congested), weather conditions (e.g., to increase the metrics due to rain or snow), time of day (e.g., to increase the metrics at night), etc.

Figure 2B:
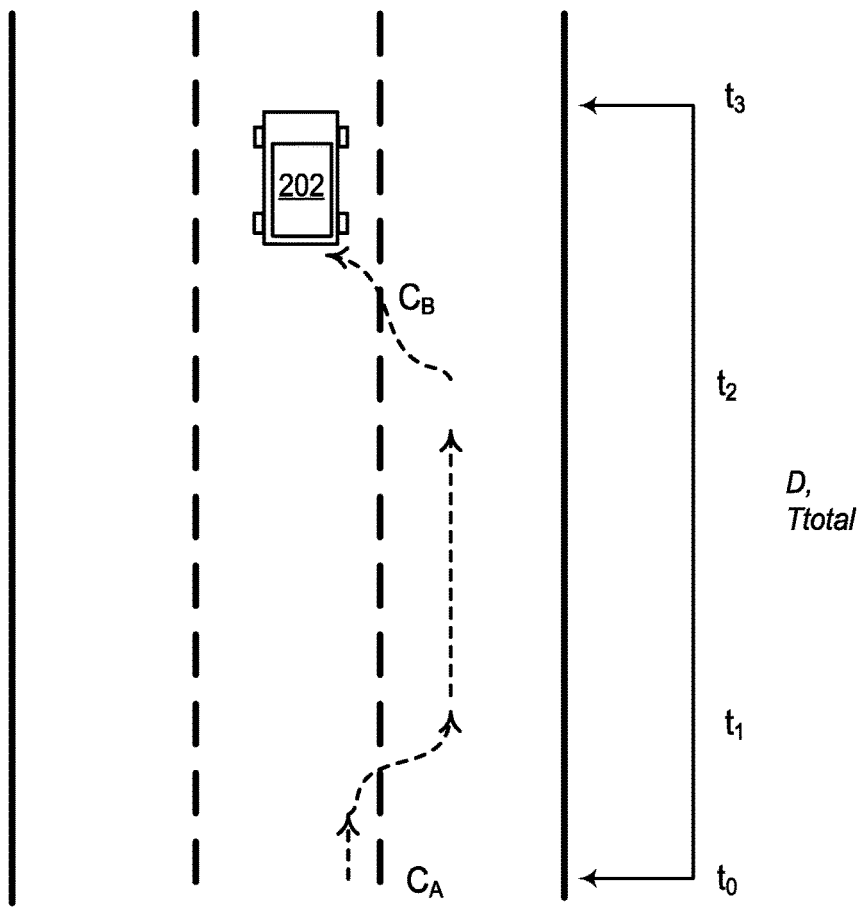
FIG. 2B is a block diagram schematically illustrating the result of traveling along a road segment with several lane changes.

As illustrated in FIG. 2B (not drawn to scale), the vehicle 202 can cover a certain distance D during a time interval $T_{total}$, and during this time the vehicle 202 can complete one maneuver at cost $C_A$, and another maneuver at cost $C_B$. In the scenario of FIG. 2B, the vehicle travels in the middle lane of a three-lane road at time $t_0$; the lane controller 125 at time $t_1$ generates a recommendation or instruction to change to the right lane, in view of the estimated speed of traffic in each of the three lanes (and possibly other factors); the lane controller 125 at time $t_2$ generates a recommendation or instruction to change back to the middle lane; and the vehicle reaches the end of the road segment at time $t_3$, when the vehicle has travelled the distance D.

The value of D can correspond to distances between waypoints or, in some cases, predefined limits. Thus, for example, if the distance between neighboring waypoints exceeds a certain threshold (e.g., one mile, three miles), the lane controller 125 can calculate the feedback signal in response to the vehicle 202 reaching the distance D relate to the position at time $t_0$. The lane controller 125 can calculate the feedback signal as $T_{total}=t_3-t_0$ and provide the value of $T_{total}$ to the ML model 124 and/or the ML model 115.

In some implementations, the lane controller 125 can limit the feedback signal to the distance travelled in one lane, e.g., the distance covered between time $t_1$ and time $t_2$. The feedback signal in this case more specifically relates to the result of choosing to travel in a particular lane during a certain amount of time. In this case, for the scenario of FIG. 2B, the lane controller 125 separately calculates respective feedback signals for the time intervals $(t_0, t_1)$, $(t_1, t_2)$, and $(t_2, t_3)$.

Notably, the ML model 124 or 115 receives this feedback signal and, more generally, the reward for changing lanes, only at the end of a relatively long event (in this example, traveling distance D). Because the information telling the ML model 124 or 115 whether the decision to change lanes at times $t_1$ and $t_2$ was good or bad is effectively withheld until the end of the event, implementing contextual bandit techniques in the ML model 124 or 115 is particularly effective. In contrast to such techniques, certain other ML models receive immediate feedback regarding the output, and reinforcement occurs shortly after an action is executed according to the prediction of the ML model. More particularly, according to these approaches, the ML model 124 or 115 receives an indication of whether the lane change at time $t_1$ was successful as soon as the vehicle 202 completes the lane change maneuver approximately at time $t_1$. The benefit of the lane change at time $t_1$ may not be immediately apparent however, and reinforcing the ML model 124 or 115 using the feedback calculated at time $t_3$ generally yields a more accurate result and thereby improves subsequent predictions the ML model 124 or 115 outputs.

In another implementation, however the ML model 124 implements a reinforcement learning technique according to which reinforcement occurs shortly after the corresponding action is executed, as discussed above with example reference to lane changes.

Figure 3:
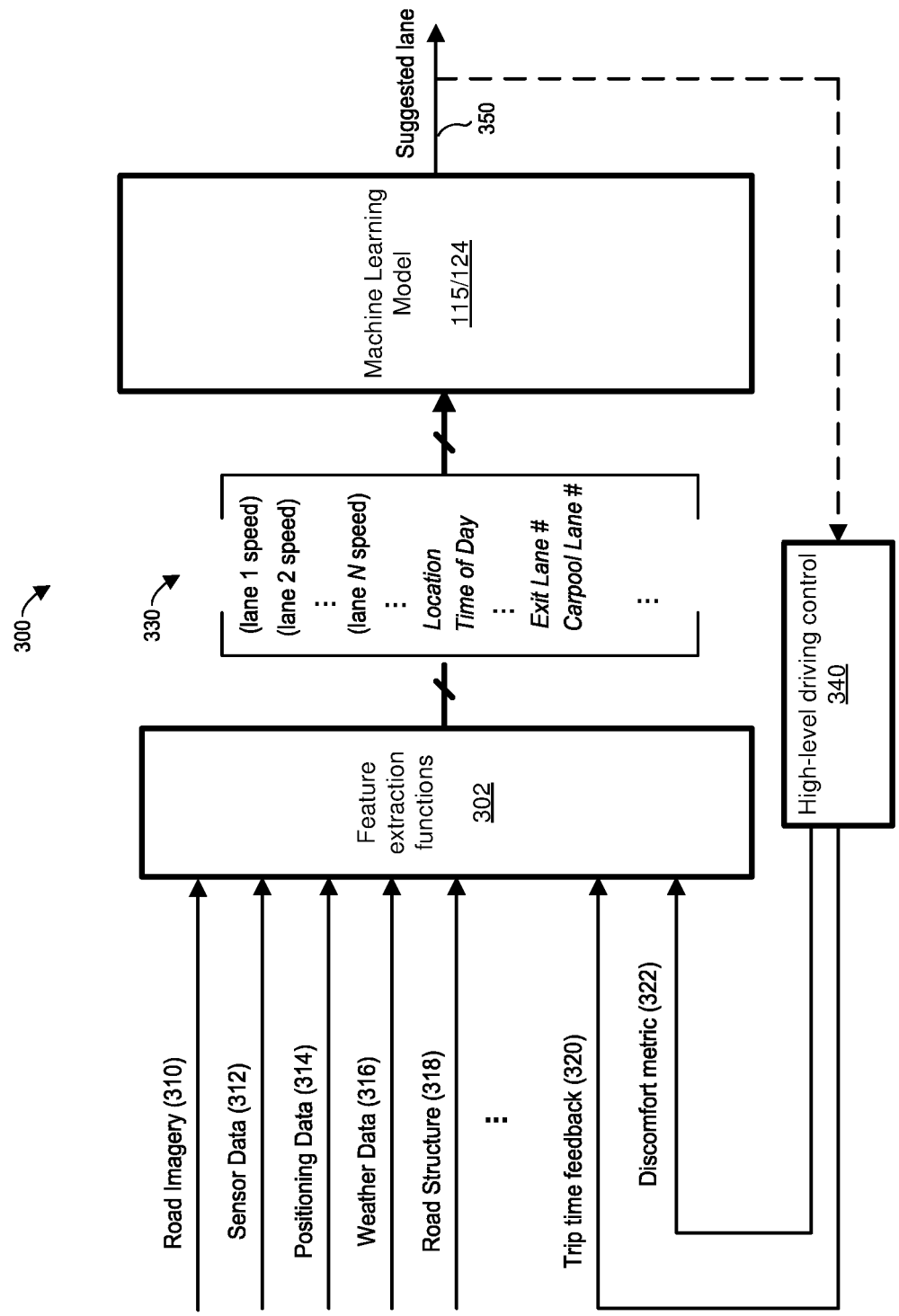
FIG. 3 is a block diagram of an example ML architecture that can be used in the system of this disclosure.

Now referring to FIG. 3, an example machine learning architecture 300 can be implemented in the server 104, the client device 102, and/or another suitable device. According to the architecture, 300, feature extraction functions 302 receive input that can include road imagery 310 (e.g., photographic images, video input), sensor data 312 (e.g., a speedometer and/or other inertial measurement unit (IMU) data, temperature data, tire pressure and other vehicle component data, lidar data), positioning data 314 (e.g., geographic coordinates), weather data 316 (which may come from an external weather service or directly from a vehicle equipped with weather sensors), road structure or geometry 318 (e.g., descriptions of permanent road geometry such as lane configuration and/or temporary properties such as lane closures, accident reports), etc. The feature extraction functions 302 also can receive feedback such as trip time 320.

The feature extraction functions 302 can process the inputs 310-320 and generate feature vectors 310. For example, the feature extraction functions 302 can apply image recognition and optical flow techniques to the received road imagery to obtain the current traffic information. In particular, the feature extraction functions 302 can determine the speed at which vehicles move in each lane (see FIG. 1B and the related discussion above). The feature extraction functions 302 further can process the road structure data 318 to identify lane restrictions such as carpool-only lanes, exit-only lanes, lanes with accidents reported in the direction of travel, etc.

The feature extraction functions 302 then can generate an example vector V=[$Speed_{vehicle}$, $Speed_{Lane1}$, $Speed_{Lane2}$, . . . $Speed_{LaneN}$, $Restriction_{Lane1}$, $Restriction_{Lane2}$, . . . $Restriction_{LaneN}$, $CurrentLocation_{vehicle}$, CurrentTrafficInformation] and apply vector V to the ML model 115 or 124. The output 350 of the ML model 115 or 124 can specify a suggested lane, which in some cases can be the lane in which the vehicle is already traveling. Depending on the implementation, the client device 102 displays the output 320 via the user interface or provides the output 320 to the self-driving control architecture. In any case, the high-level driving control 308 generates feedback 320 based on the time the vehicle took to travel a certain distance, such as distance D of the example illustrated in FIG. 2B. A discomfort metric 320 can assign a numerical score to the discomfort associated with the lane change. For example, the driving control 308 can assign a higher value to lane changes that took longer that some predetermined amount of time to complete or required changes in speed in excess of a certain baseline (in other words, sudden braking or acceleration), for example.

In other implementations, the feature extraction functions 302 generate other feature vectors including more or fewer parameters or features. For example, the feature extraction functions 302 can treat the following factors as separate features: time of day (because drivers can apply different decision strategies to lane selection during the day and at nighttime), current weather conditions (because rain and snow can increase the cost of lane changes to drivers or autonomous vehicles, in terms of time and safety risks), lane restrictions (because a vehicle may not be permitted to change to a carpool lane in certain cases), and the overall speed of traffic (because changing lanes in slow-moving traffic can be more difficult due to interaction with other vehicles).

In some implementations, the ML architecture 300 includes a neural network (not shown) that generates learned representations and supplies these learned representations as features to the ML model 115 or 124. More specifically, the neural network can receive imagery (e.g., a photograph, a series of photographs) captured by the camera operating in the vehicle and generates features in addition to those which the feature extraction functions 302 are configured to recognize.

When training the user-specific ML model 124, the architecture 300 supplies indications of lane changes for various contexts and calculates the corresponding rewards, in view of the numerical metrics of the cost associated with lane changes. Thus, for example, a user can travel along a certain road segment a certain number of times, and the training data can indicate respective travel times for different situations when the user changed lanes or chose not change lanes. The server 104 can train the ML model 115 using training data from multiple users, for multiple road segments, etc.

After training the user-specific ML model 124 using this training data, the lane controller 125 can apply the ML model 124 to determine whether the user or the autonomous vehicle should change lanes in various scenarios. For given, for certain speeds of traffic in each lane, and for certain weather conditions, the lane controller 125 uses the ML model 124 to determine whether the vehicle should change lanes or continue travelling in the same lane.

Figure 4:
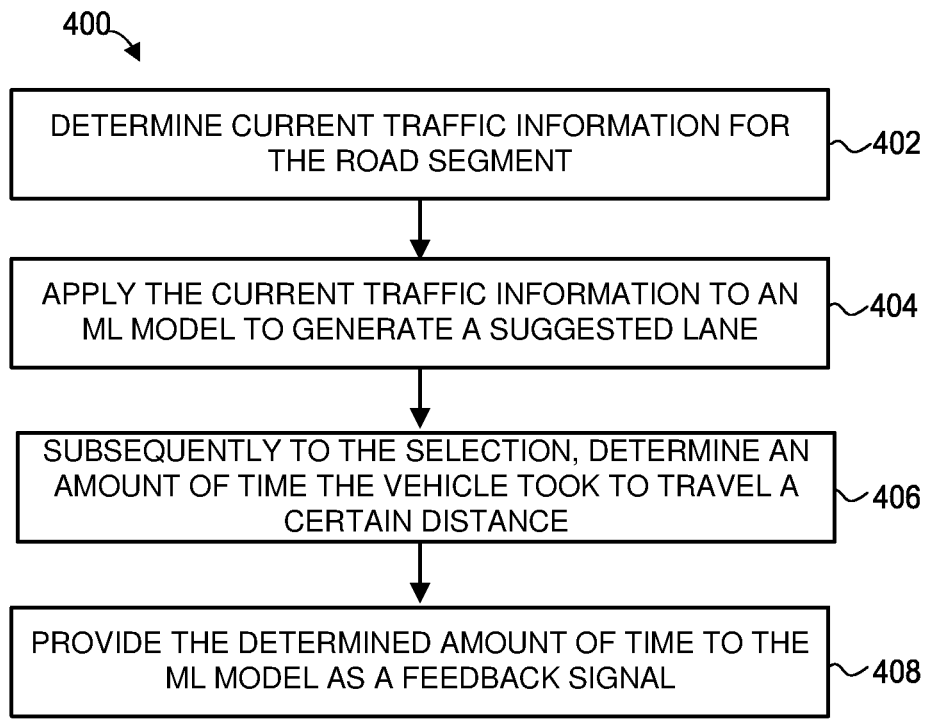
FIG. 4 is a flow diagram of an example method for selecting a lane in a multi-lane road, which can be implemented in the system of FIG. 1A or 1B.

Now referring to FIG. 4, an example method 400 for selecting a lane in a multi-lane road can be implemented in the server 104 and/or the client device 102, for example, or any other suitable system. At block 402, the system determines the current traffic information for a road segment. As discussed above, the system can obtain this information by analyzing road imagery captured by the camera of a smartphone mounted on the dashboard, a dedicated camera mounted on the dashboard, one or more cameras built into the vehicle, or any other suitable camera. Further, the system in some cases can obtain the road imagery from other sources, such as from overhead cameras permanently installed at intersections, satellites, etc.

At block 404, the system applies the current traffic information to an ML model to generate a lane suggestion. To this end, the system can identify targets such as vehicles and track these targets to estimate the speed of traffic individually for each lane. The system can train the ML model using previous lane changing decisions made by users for various traffic conditions, weather conditions, times of day, etc.

At block 406, the system determines assesses the impact of the lane suggestion, in those situations where the user or the autonomous vehicle accepted the lane suggestion and executed the lane change maneuver (or stayed in the same lane in accordance with the suggestion). In particular, the system can determine the amount of time the vehicle took to travel a certain distance subsequently to accepting the lane suggestion. Next, at block 408, the system applies the determined amount of time to the ML model as a feedback signal.

Figure 5:
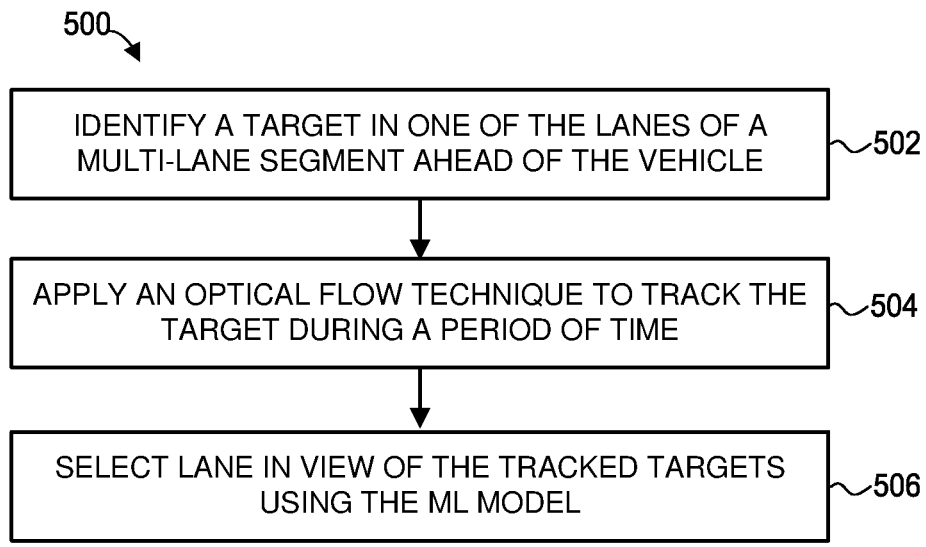
FIG. 5 is a flow diagram of an example method for generating a lane-specific reward for the ML model based on an observed movement of a target in the corresponding lane.

FIG. 5 is a flow diagram of an example method 500 for generating a lane-specific reward for the ML model based on an observed movement of a target in the corresponding lane. The method 500 begins at block 502, where the system identifies a target such as a vehicle on a multi-lane segment ahead of the vehicle (see FIG. 1B). The system can apply suitable image recognition techniques to select and classify targets.

At block 504, the system can apply suitable optical flow techniques to track the target through a sequence of images during a certain period of time, so that the system can estimate the speed at which traffic moves in the corresponding lane. At block 506, the system applies the estimates of how fast traffic moves in various lanes to an ML model, which then generates a recommendation regarding which lane the vehicle should use. As discussed above, the system also can apply additional inputs to the ML model, such as further descriptions of the context (e.g., weather, time of day), legal restrictions (e.g., lane utilization rules), etc.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 400 and 500 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 400 and 500 may be included as part of any backend server (e.g., an augmented reality server, a ridesharing server, a map data server, a navigation server, or any other type of server computing device, as described herein), client computing device modules of the example environment, for example, or as part of a module that is external to such an environment. Though the figures may be described with reference to the other figures for ease of explanation, the methods 800 and 900 can be utilized with other objects and user interfaces. Furthermore, although the explanation above describes steps of the methods 400 and 500 being performed by specific devices, this is done for illustration purposes only. The blocks of the methods 400 and 500 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

What is claimed is:

1. A method for selecting a lane in a multi-lane road segment for a vehicle travelling on the road segment, the method comprising:
    identifying, in a plurality of lanes and in a region ahead of the vehicle, another vehicle defining a target;
    applying an optical flow technique to track the target during a period of time, to generate an estimate of how fast traffic moves; and
    applying the estimate to machine learning (ML) model to generate a recommendation which one of the plurality of lanes the vehicle is to choose.

2. The method of claim 1, further comprising:
    receiving, from a camera mounted in the vehicle, imagery of a road segment during a certain period of time; and
    applying image classification to the imagery to identify the target.

3. The method of claim 1, further comprising:
    receiving imagery of the region ahead of the vehicle from an external camera.

4. The method of claim 1, further comprising:
    processing a feedback signal subsequent to a lane change in accordance the recommendation, the feedback signal corresponding to one of a time or a distance travelled; and
    applying the feedback signal to the ML model.

5. The method of claim 1, further comprising:
    identifying a plurality of respective targets in the plurality of lanes; and
    applying the optical flow technique to track the targets, to generate respective estimates of how fast the plurality of targets move.

6. The method of claim 5, further comprising:
applying, to the ML model, the estimates of how fast the plurality of targets move in the respective lanes as a reward for executing a lane change.

7. The method of claim 6, wherein applying the estimates as the reward includes, for a lane change from an original lane to a new lane and subsequently to executing the lane change:
calculating a first reward based on the speed of travel in the original lane; and
calculating a second reward based on the speed of travel in the new lane.

8. The method of claim 1, wherein the ML model includes a metric of discomfort associated with a lane change, the metric specific to a driver of the vehicle.

9. The method of claim 8, further comprising:
generating the metric of discomfort for the driver based on driving patterns of the driver.

10. The method of claim 1, further comprising:
determining a cost metric associated with a lane change in view of environmental conditions; and
using the cost metric with the ML model to generate the recommendation.

11. A computing system configured to select a lane in a multi-lane road segment for a vehicle travelling on the road segment, the system comprising processing hardware and configured to:
identify, in a plurality of lanes and in a region ahead of the vehicle, another vehicle defining a target;
apply an optical flow technique to track the target during a period of time, to generate an estimate of how fast traffic moves; and
apply the estimate to machine learning (ML) model to generate a recommendation which one of the plurality of lanes the vehicle is to choose.

12. The system of claim 11, further configured to:
receive, from a camera mounted in the vehicle, imagery of a road segment during a certain period of time; and
apply image classification to the imagery to identify the target.

13. The system of claim 11, further configured to:
receive imagery of the region ahead of the vehicle from an external camera.

14. The system of claim 11, further configured to:
process a feedback signal subsequent to a lane change in accordance the recommendation, the feedback signal corresponding to one of a time or a distance travelled; and
apply the feedback signal to the ML model.

15. The system of claim 11, further configured to:
identify a plurality of respective targets in the plurality of lanes; and
apply the optical flow technique to track the targets, to generate respective estimates of how fast the plurality of targets move.

16. The system of claim 15, further comprising:
apply, to the ML model, the estimates of how fast the plurality of targets move in the respective lanes as a reward for executing a lane change.

17. The system of claim 16, wherein to apply the estimates as the reward the system is configured, for a lane change from an original lane to a new lane and subsequently to executing the lane change, to:
calculate a first reward based on the speed of travel in the original lane; and
calculate a second reward based on the speed of travel in the new lane.

18. The system of claim 11, wherein the ML model includes a metric of discomfort associated with a lane change, the metric specific to a driver of the vehicle.

19. The system of claim 18, further configured to:
generate the metric of discomfort for the driver based on driving patterns of the driver.

20. The system of claim 11, further configured to:
determine a cost metric associated with a lane change in view of environmental conditions; and
use the cost metric with the ML model to generate the recommendation.

* * * * *